(No Model.) 2 Sheets—Sheet 2.
R. J. BAMFORD.
SAW TOOTH.
No. 470,967. Patented Mar. 15, 1892.
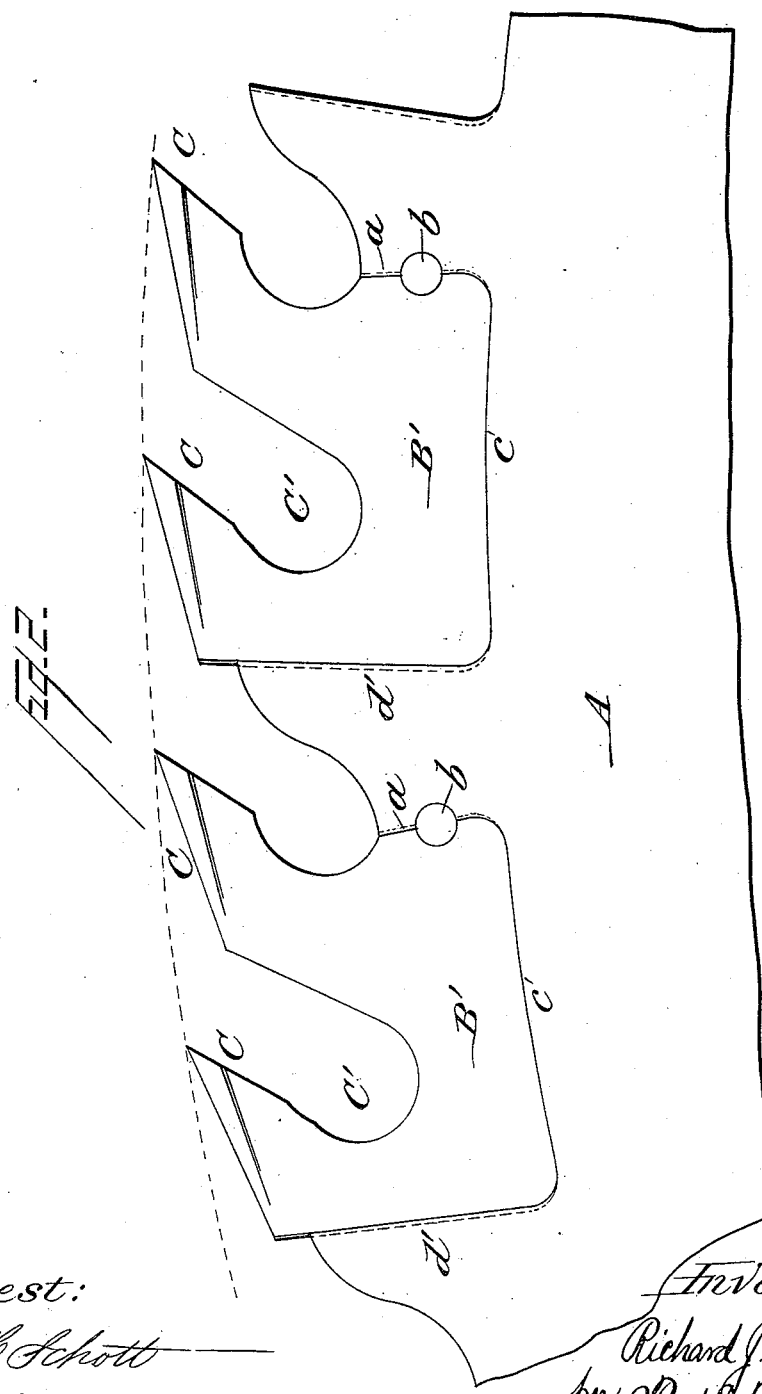
Attest:
F. H. Schott
Wm. L. Boyden.
Inventor
Richard J. Bamford
per Fred E. Tasker, Atty.

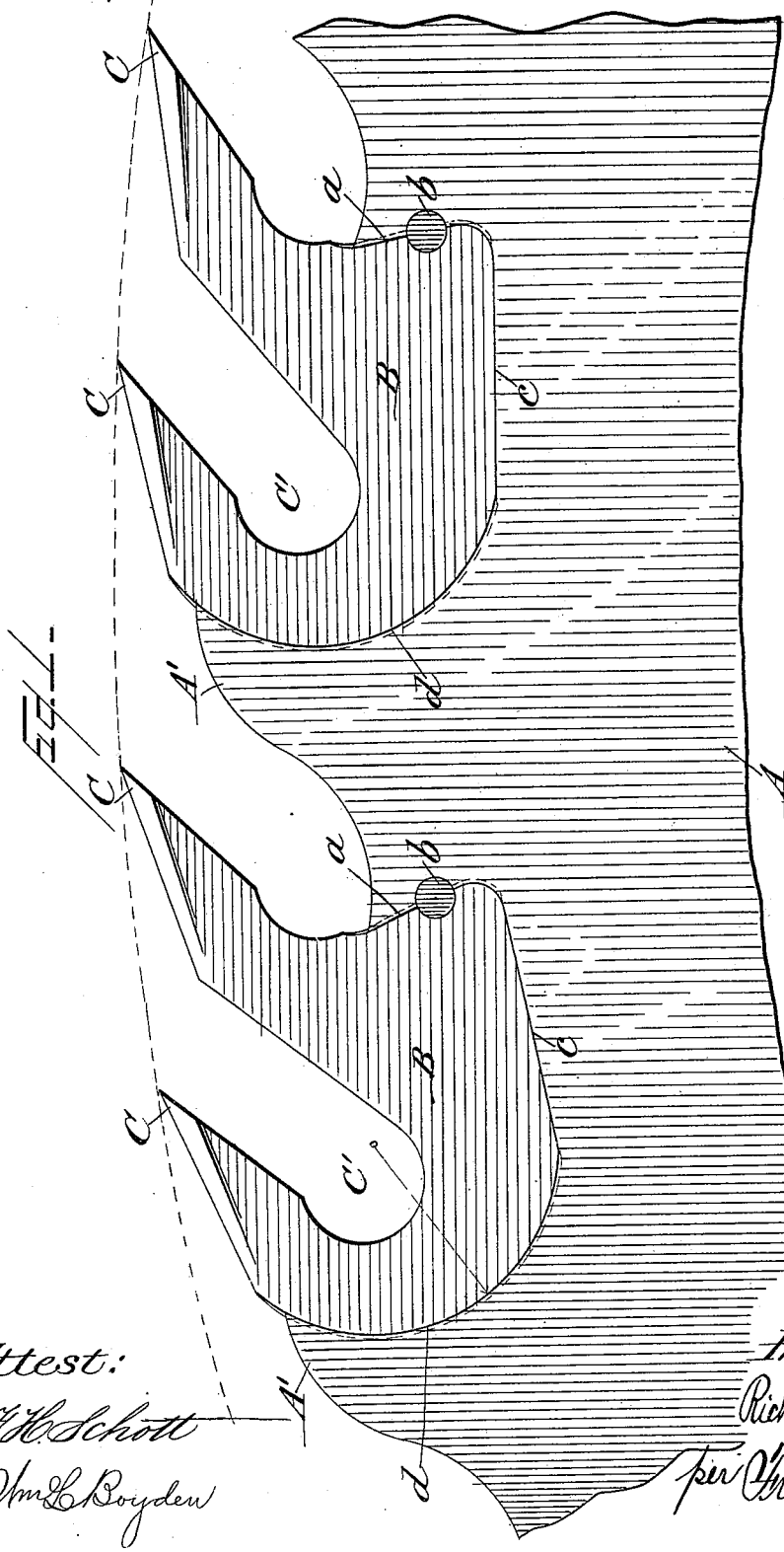

UNITED STATES PATENT OFFICE.

RICHARD J. BAMFORD, OF TRENTON, NEW JERSEY, ASSIGNOR TO THE AMERICAN SAW COMPANY, OF SAME PLACE.

SAW-TOOTH.

SPECIFICATION forming part of Letters Patent No. 470,967, dated March 15, 1892.

Application filed August 18, 1891. Serial No. 403,021. (No model.)

*To all whom it may concern:*

Be it known that I, RICHARD J. BAMFORD, a citizen of the United States, residing at Trenton, in the county of Mercer and State of New Jersey, have invented certain new and useful Improvements in Saw-Teeth; and I do hereby declare the following to be a full, clear, and exact description of the invention, such as will enable others skilled in the art to which it appertains to make and use the same.

This invention relates to an improvement in saw-teeth, its object being to perfect and improve the construction of that class of teeth commonly known as "insertible" teeth, so as to enable more teeth to be arranged in a given length of saw-plate and thereby increase the cutting efficiency of the saw.

The invention therefore consists in the construction, arrangement, and combination of the several parts, substantially as will be hereinafter described and claimed.

In the accompanying drawings, illustrating my invention, Figure 1 is a plan view of a section of a saw-plate provided with my improved saw-teeth. Fig. 2 is a similar plan view showing the form of the teeth slightly modified.

Like letters of reference denote like parts.

A designates a portion of a saw-plate having its periphery provided with suitable recesses to receive the teeth. Between these recesses are the pointed projections A′, having the compoundly-curved rear edges. The peripheral recesses are preferably formed with the inner or basal or lower straight edge $c$, the rear concave edge $d$, which is curved on the arc of a true circle, and the front straight or slightly-curved edge $a$, which connects with the lower edge $c$ by an abrupt curved turn, and which lies in a direction inclined slightly to the radius of the saw—that is to say, at right angles in a general way to the direction of the periphery of the saw-plate or slightly inclined to such a position. These edges of the saw-plate recesses are (all or part of them) provided with the usual ribs or tongues that enter grooves in the saw-teeth, so as to retain the latter securely in position.

B B designate the teeth plate or bodies, which are designed to be received into the recesses which I have just described and to be securely held therein by means of rivets $b$, and said plates B are therefore shaped properly to enable them to fit neatly within the receiving-recesses, having edges that conform to the edges $a$, $c$, and $d$ of the recesses. The teeth plates or bodies B are each provided with two teeth or cutting-points C C of the usual form and projecting therefrom so as to lie close together. These teeth project in substantially parallel lines.

C′ denotes a curved recess at the base-point between the companion teeth of each plate B. The several teeth C C lie in such position as to be touched by a common circular line having the saw-center for its center and shown in the drawings by the dotted line. It will thus be seen that each tooth or tooth-plate has two cutting-points. In this way a much larger number of cutting-points can be inserted into a saw-plate having a given diameter than is the case where only one tooth is on each shank. Thus the saw can be made more efficient. This is accomplished, moreover, without increasing the expense of the saw or the difficulty attending its construction.

Referring now to Fig. 2, it will be seen that the form of the teeth B′ there shown is slightly modified. The rear edge of the tooth-shank at $d'$ is straight instead of being curved, as at $d$ in Fig. 1; also, it will be observed that the general form of the recesses in the saw-plate tends rather toward a square shape adapted to receive a corresponding square-shape saw-tooth shank B′.

Having thus described my invention, what I claim as new, and desire to secure by Letters Patent, is—

The combination of the saw-plate A, having peripheral recesses provided with a straight lower edge $c$, a concave curved rear edge $d$, which is curved in the arc of a true circle, a forward straight edge *a*, which connects with the edge *c* by an abrupt curved turn, and the correspondingly-shaped plate B, having the cutting-points C C, projecting therefrom closely side by side and substantially parallel, the several teeth lying in such position as to be touched by a common circular line having the saw-center for its center, and the rivets *b* for securing the plate B in position, substantially as described.

In testimony whereof I affix my signature in presence of two witnesses.

RICHARD J. BAMFORD.

Witnesses:
  J. S. WORTHINGTON,
  A. LAUSHE.